Figure 1:
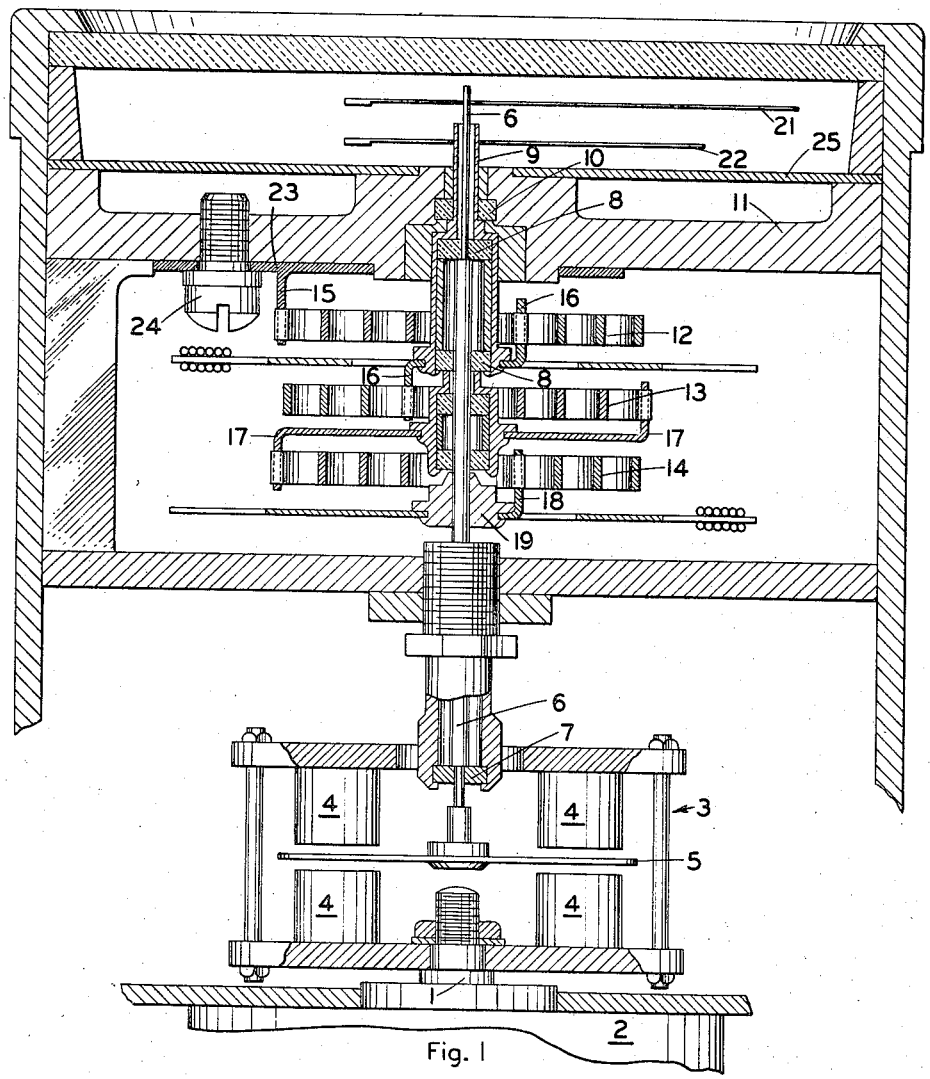

April 21, 1959

R. E. ANDERSON 2,882,855

MULTIPLE POINTER INSTRUMENT

Filed Nov. 9, 1956

Inventor:
Richard E. Anderson
by Richard E. Horley
His Attorney

United States Patent Office 2,882,855
Patented Apr. 21, 1959

2,882,855

MULTIPLE POINTER INSTRUMENT

Richard E. Anderson, Lynn, Mass., assignor to General Electric Company, a corporation of New York Application November 9, 1956, Serial No. 621,322

4 Claims. (Cl. 116—129)

This invention relates to indicating instruments and more particularly to improved indicating means employing multiple pointers movable coaxially over a single dial.

In numerous instances the data communicated by a single instrument pointer cooperating with a single circular scale is insufficiently accurate, so that it is frequently necessary that two or more pointers be provided to make the instrument presentation. Normally a pair of pointers is used, the one capable of making multiple revolutions of the circular scale to extend the readable range of the instrument and the other recording the number of revolutions made by the first pointer. In the construction of multiple pointer instruments of this nature it is customary, whether the pointers are mounted on coaxial shafts or on axially displaced shafts, to gear the pointers to one another in a watch-like fashion so that the angular movements of the pointers with respect to their associated dials bear a constant ratio to one another. While such geared instruments generally perform in a satisfactory manner, the gear assemblies themselves contribute materially to the expense of construction by virtue of the precision demanded of them and the numerous accurately positioned shafts and bearings required. This invention seeks to reduce the cost and complexity of multiple pointer instruments by eliminating internal gearing between instrument pointers and replacing the function of the gears by a unique resilient restraining arrangement. Particularly advantageous utilization of these concepts is realized in tachometer indicators, although the invention itself has broader applications.

It is therefore an object of this invention to provide an improved multiple pointer instrument mechanism having but few parts and a remarkable simplicity of construction.

Another object is to provide a multiple pointer tachometer indicator without internal gearing.

By way of a brief summary of a single aspect of this invention, there are provided in a tachometer indicator two coaxial pointer shafts supporting instrument pointers cooperating with a circular instrument scale, both shafts being driven against the restraint of a spiral spring arrangement by a single drive shaft which moves angularly in accordance with the torques imposed upon its eddy current drag disc by rotating tachometer magnets. The inner pointer shaft is an extension of the drive shaft and rotates with it against the restraining torque of resilient means comprising three serially connected spiral springs coupled with the inner pointer shaft at one end and fixed to an instrument frame at the other stationary end. The outer pointer shaft is angularly positioned by the flexure of the free end of the spiral spring whose outer end is anchored to the frame. When a torque is supplied to the eddy current drag disc, it forces an angular movement of the inner pointer shaft against the combined restraint of the entire spiral spring arrangement, each spiral spring flexing by a given amount determined by its spring constant. The flexibilities of each of the spiral springs are so determined that the first spring which has its outer end affixed to the frame is flexed by an amount equal to one-tenth of the angular displacement of the entire spring arrangement. Hence, as the inner pointer shaft turns through a complete revolution, the outer pointer shaft is angularly displaced by 36°.

Figure 2:
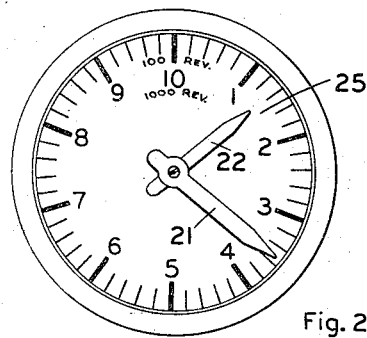

Although this invention is not to be limited except by a fair interpretation of the appended claims, further details of the invention, as well as additional advantages derived therefrom, may perhaps be better understood in connection with the accompanying drawings wherein:

Figure 1 is a cross sectional view of a tachometer indicator embodying the teachings of this invention, and Figure 2 represents a plan view of the instrument dial of Figure 1 showing relative positions of the pointers.

In the dual pointer tachometer indicator here illustrated it is preferred to display the rotations per minute of a revolving body, such as an engine shaft, by the use of two pointers cooperating with a single scale. The long pointer in cooperation with the scale indicates hundreds of revolutions per minute while the short pointer in cooperation with the same scale measures thousands of revolutions per minute. Thus the data exhibited by the instrument dial as it is shown in Figure 2 is approximately 1350 r.p.m. It is therefore apparent that for each revolution of the instrument dial by the long pointer the short pointer must move one-tenth of a revolution, effectively counting the total revolutions made by the long pointer.

My preferred mechanism for embodying the invention in a tachometer indicator having a visible dial such as that of Figure 2 appears in the cross sectional view in Figure 1, corresponding parts being identified by the same reference characters in these two views. Indications are derived responsive to the speed of the output shaft 1 of a synchronous motor 2, the three-phase power excitation for this motor being transmitted from a tachometer generator, not illustrated, which produces a power output having a frequency proportional to the angular velocity of an engine or other rotating apparatus to which the generator is applied. A magnet assembly 3 comprising oppositely disposed sets of permanent magnets 4 is rotated by motor 2, and an eddy current drag disc 5 positioned in the small air gap between the magnet sets and is urged to rotate in the same angular direction as the magnets. Disc 5 is attached to the internal pointer shaft 6 which is rotatably supported at opposite ends by jewel bearings 7 and 8. The outer pointer shaft is shown in this instance in the form of a sleeve 9 free to rotate on jewel bearing 10 with respect to the instrument frame 11 and permitting relative angular movement of the inner pointer shaft on jewel bearings 8.

Resilient means restraining relative angular movement between the inner and outer pointer shafts and relative angular movement of both shafts with respect to the instrument frame is shown as comprising three series connected spiral springs 12, 13 and 14. Spiral spring 12 is anchored at its outer end to an anchor arm 15 and at its inner end to anchor arm 16 rigidly connected to the outer pointer shaft 9. Anchor arm 16 also connects the internal end of spiral spring 12 serially to the internal end of spiral spring 13. An additional anchor arm 17 connects the outer ends of spiral springs 13 and 14 in series, while the inner end of spiral spring 14 is connected by an additional anchor arm 18 to hub 19 rigidly affixed to the inner pointer shaft 6.

When the magnet assembly 3 is stationary and no torque is applied to the eddy current drag disc 5, spiral springs 12, 13 and 14 are free to relax and the pointers 21 and 22 affixed respectively to the inner and outer pointer shafts will assume a zero position. A zero adjustment is provided by angularly positioning base plate 23, with which anchor arm 15 is integral, coaxially about the instrument pointer shafts. At the zero position the base plate may be fastened by tightening screw 24. Upon rotation of the drag magnet assembly, a torque will be applied to eddy current disc 5 which will tend angularly to displace inner pointer shaft 6 and therefore pointer 21 against the combined restraint of the entire spiral spring arrangement. Springs 13 and 14 in this construction have been selected of equal size and with similar spring constants. In this design two springs are used at this point rather than one to allow for greater rotation of the inner pointer shaft than would be possible with only one spring of equivalent size. Spring 12, however, is stiffer than springs 13 and 14 and its design constants are such that it will allow 36° of rotation to the outer pointer shaft 9 and pointer 22 for 360° rotation of shaft 6 and pointer 21. Therefore, with an indicator dial 25 defined in tenths as shown in Figure 2, the short pointer 22 will move from zero to 1 while the long pointer 21 moves from zero to 10. Likewise, as the long pointer continues to move through another revolution, the short pointer will move from 1 to 2 and from 2 to 3 through successive revolutions, the total number of revolutions being limited by the design and number of springs used.

It is apparent that the elimination of the internal gearing heretofore used in instruments of this nature and the replacement of their function by the resilient restraining means described above results in a simpler instrument having fewer moving parts without the sacrifice in any way of performance. As would ordinarily be suspected, frictions resulting from the inter-meshing of gears and the additional bearings which gears require have been minimized.

Although the invention has been described with some particularity in connection with a tachometer indicator, it will be apparent to those skilled in the art that these teachings, in fact, may be applied to other instrument mechanisms as well. Thus, it may be desirable to provide a weighing machine which has a dual pointer arrangement with a similar instrument mechanism permitting multiple revolutions of one of the pointers and proportional angular movement of the other pointer. The instrument pointers may cooperate with independent scales and the resilient restraining mechanism may have other forms than that shown, the number of permissible spring arrangements being a matter of choice and design. It may also be desirable to provide more than two instrument pointers interconnected in the manner set forth herein to increase the range or accuracy of the instrument with, for example, one pointer reading tens, another hundreds, and a third reading thousands of revolutions per minute. These and other omissions, additions, modifications and substitutions within the purview of these teachings may be made without departing either in spirit or in scope from this invention in its broader aspects.

What I claim as new and desire to secure by Letters Patent of the United States is:

1. A tachometer indicator comprising: an instrument frame; an instrument dial fixed to said frame; a pair of coaxial shafts supported for relative angular movement and angular movement relative to said frame; a pointer attached to each of said shafts for angular movement over said dial; a first spiral spring arrangement restraining angular movement of the first of said pair of shafts with respect to said frame; a second spiral spring arrangement restraining angular movement of the second of said pair of shafts with respect to the first of said pair of shafts said spiral spring arrangements providing the sole restraint against relative angular movement of said pair of shafts; and means for applying to the second of said shafts a torque proportional to the angular velocity of a rotating body, whereby angular movement of the first of said pair of shafts in response to said torque is accompanied by a proportional angular movement of the second of said shafts.

2. A tachometer indicator comprising: an instrument frame; an instrument dial fixed to said frame; a plurality of coaxial shafts supported for relative angular movement and angular movement relative to said frame; an instrument pointer attached to each of said shafts for angular movement over said dial; first resilient means restraining relative angular movement between a first of said shafts and said frame; second resilient means restraining relative angular movement between a second of said shafts and the first of said shafts, said first and second resilient means providing the sole restraint against angular movement of said first and second shafts relative to said frame and relative to each other; means for applying between the second of said shafts and said frame against the combined restraint of said first and second resilient means a deflecting torque which is a function of the angular velocity of a rotating body, whereby the angular movement of the first of said shafts is in proportion to the angular movement of the second of said shafts in response to said deflecting torque.

3. A resiliently restrained instrument indicator arrangement comprising: a plurality of coaxial angularly movable shafts; an instrument frame; means supporting said shafts for relative angular movement and angular movement relative to said frame; first resilient means angularly restraining relative movement between a first of said shafts and said frame; second resilient means angularly restraining relative movement between a second of said shafts and the first of said shafts, said first and second resilient means providing the sole restraint against angular movement of said first and second shafts relative to said frame and relative to each other; means for applying to the second of said shafts a deflecting torque proportional to the value of a measured condition, whereby angular movement of the first of said shafts is in proportion to the angular movement of the second of said shafts occasioned by said deflecting torque.

4. In combination: a plurality of coaxial shafts; stationary means supporting said shafts for relative angular movement and angular movement relative to said stationary means; a spiral spring arrangement; means anchoring a terminal portion of said spring arrangement to said stationary means; means connecting another terminal portion of said spring arrangement to a first of said angularly movable shafts resiliently to restrain the movement thereof; and means connecting still another portion of said spring arrangement intermediate said terminal portions to a second of said angularly movable shafts, the second of said shafts being unopposed in its angular movements save by the resilient restraint of said spring arrangement, whereby angular movement of the first of said shafts in response to a torque applied thereto is accompanied by a proportional angular movement of the second of said shafts.

References Cited in the file of this patent

UNITED STATES PATENTS 2,717,573  Murray _____ Sept. 13, 1955